United States Patent
Soini et al.

(10) Patent No.: US 9,851,797 B1
(45) Date of Patent: Dec. 26, 2017

(54) HAPTIC ARRANGEMENT OF A MULTIPLE PART ELECTRONIC DEVICE

(71) Applicant: Microsoft Technology Licensing, LLC, Redmond, WA (US)

(72) Inventors: Sakari Soini, Somero (FI); Kimmo Laakkonen, Salo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/241,058

(22) Filed: Aug. 18, 2016

(51) Int. Cl.
*G06F 3/01* (2006.01)
*G06F 1/16* (2006.01)
*G08B 6/00* (2006.01)

(52) U.S. Cl.
CPC ............ *G06F 3/016* (2013.01); *G06F 1/1616* (2013.01); *G08B 6/00* (2013.01); *G06F 1/1643* (2013.01); *G06F 1/1654* (2013.01); *G06F 1/1662* (2013.01); *G06F 1/1681* (2013.01)

(58) Field of Classification Search
CPC ........ G06F 3/016; G06F 3/048; G06F 3/0481; G06F 1/1605; G06F 1/1618; G06F 1/1643; G06F 3/017; G06F 3/041; G06F 3/0488
See application file for complete search history.

(56) References Cited

U.S. PATENT DOCUMENTS

| | | |
|---|---|---|
| 5,915,440 A | 6/1999 | Repo |
| 6,305,050 B1 | 10/2001 | Imai |
| 7,635,275 B2 | 12/2009 | Fyke |
| 7,714,801 B2 | 5/2010 | Kimmel |
| 7,925,314 B2 | 4/2011 | Liao et al. |
| 8,369,075 B2 | 2/2013 | Huang |
| 8,662,731 B2 | 3/2014 | Wang et al. |
| 8,705,229 B2 | 4/2014 | Ashcraft et al. |
| 8,787,016 B2 | 7/2014 | Rothkopf et al. |
| 8,804,324 B2 | 8/2014 | Bohn et al. |
| 8,816,977 B2 | 8/2014 | Rothkopf et al. |
| 2001/0054986 A1 | 12/2001 | Leman |
| 2002/0054060 A1* | 5/2002 | Schena ................. G01D 7/007 715/701 |
| 2004/0052044 A1 | 3/2004 | Mochizuki et al. |
| 2008/0313857 A1 | 12/2008 | Eromaki |
| 2014/0355195 A1 | 12/2014 | Kee et al. |
| 2016/0282964 A9* | 9/2016 | Kim .................... G06F 3/03545 |

* cited by examiner

*Primary Examiner* — Kabir A Timory

(57) ABSTRACT

A multiple part electronic device is disclosed, the device comprising a first housing portion, a second housing portion, a connecting element that mechanically couples the first housing portion to the second housing portion, and a haptic element configured to induce a haptic effect arranged in at least one of the first housing portion or the second housing portion. The haptic element is in direct contact with the connecting element. The connecting element is a haptics guiding element configured to transmit the haptic effect between the first housing portion and the second housing portion.

20 Claims, 3 Drawing Sheets

HAPTIC ARRANGEMENT OF A MULTIPLE PART ELECTRONIC DEVICE

BACKGROUND

Multiple part electronic devices having mutually connected housing portions are available. Haptic feedback is a feature in the electronic devices enabling users to experience tactile sensations by applying forces, vibrations, or motions to the user.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A multiple part electronic device is disclosed. The multiple part electronic device comprises a first housing portion, a second housing portion, a connecting element that mechanically couples the first housing portion to the second housing portion; and a haptic element configured to induce a haptic effect is arranged in at least one of the first housing portion and the second housing portion. The haptic element is in contact with the connecting element. The connecting element is a haptics guiding element configured to transmit the haptic effect between the first housing portion and the second housing portion.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

The drawings in the Figs are not in scale.

DETAILED DESCRIPTION

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in a device such as a tablet computer, this is only an exemplary implementation and not a limitation. As those skilled in the art will appreciate, the present embodiments are suitable for application in a variety of different types of computing devices, for example mobile telephones, smartphones, laptop computers, handheld game consoles, music players, media players etc., wherein haptic feedback may be utilized.

The term 'computer', 'computing apparatus', 'mobile device' is used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants and many other devices.

Modern multiple part electronic devices are being designed to be thin, e.g. having a thickness of a just few millimeters, and therefore, inside the housing portion of the electronic device, the space which is available for a haptic element is also very small. At the same time, the haptic elements cannot be substantially downsized, because it weakens their haptics performance. At least some of the embodiments may allow, for example, a simple arrangement of a traditional haptic element that can cause a haptic feedback both in the housing portion of the electronic device wherein the haptic element is physically located but also in another near to housing portion connected by a connecting element to said housing portion. Since the haptic element is arranged in a direct contact with the connecting element that connects the housing portions, the haptic effect is transmitted via the connecting element to said another near to housing portion. At least some of the embodiments may allow that the haptic effect, such as vibration, is amplified by the mass of said housing portion whereto the haptic effect is transmitted via the connecting element, and a strong haptic feedback can be generated therein without having to arrange further haptic element in that another housing portion.

Figures 1, 2:
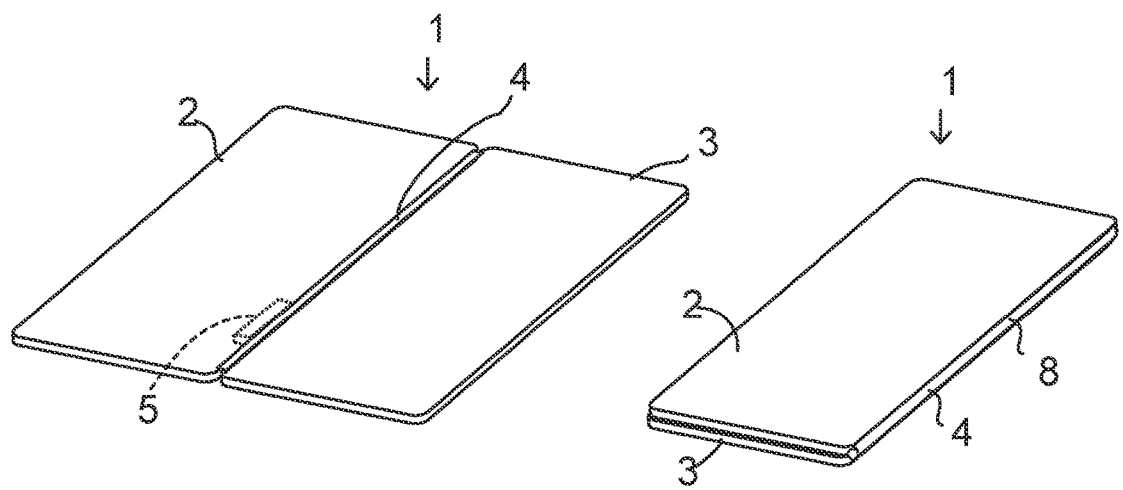
FIGS. 1 and 2 are a schematic axonometric views of a multiple part electronic device comprising two housing portions according to an embodiment in flat and folded positions.

FIG. 1 illustrates a multiple part electronic device 1 according to an embodiment. The electronic device 1 may be, for instance, a mobile device, a tablet computer, a smartphone or a mobile phone, a phablet, a media player, a personal digital assistant, an e-book reader, a game console, a wearable device, a display or a flat-screen television.

As can be seen in FIGS. 1 and 2, in this embodiment, the electronic device 1 is foldable. It comprises a first housing portion 2 and a second housing portion 3. A connecting element 4 mechanically couples the first housing portion 2 to the second housing portion 3. A haptic element 5 configured to induce a haptic effect is arranged in the first housing portion 2. It is beneficial to arrange the haptic element 5 in only one of the housing portions 2, 3. In an embodiment, if desired, one or more haptic elements may be arranged in both housing portions 2, 3.

The haptic element 5 may be in direct contact with the connecting element 4. The connecting element 4 is a haptics guiding element configured to transmit the haptic effect between the first housing portion 2 and the second housing portion 3.

The connecting element 4 may be a hinge element 8 that enables folding of the housing portions 2, 3. FIG. 1 shows the electronic device in a flat position wherein the angle between first housing portion 2 and the second housing portion 3 is 180 degrees or substantially 180 degrees. According to an embodiment, substantially 180 degrees refers to an angle of 180 degrees±5 degrees. FIG. 2 shows the electronic device 1 of FIG. 1 in a folded position wherein the first housing portion 2 and the second housing portion 3 are in a stacked relationship the angle between first housing portion 2 and the second housing portion 3 being 0 degrees. In an embodiment, the hinge element 8 may be any suitable hinge element which enables rotation, folding or pivoting motion of the housing portions. In an embodiment, the hinge element 8 may be any suitable hinge element which provides a freedom of rotation between any range selected from 0 to 360 degrees. In an embodiment, the connecting element 4 and/or hinge element 8 may such that it enables detaching of one the housing portions 2, 3 from each other. In an embodiment the connecting element comprises a magnet for holding the at least one housing part to provide a detachable connection. In an embodiment, as in the embodiment shown in FIGS. 1 and 2, the multiple-part electronic device 1 may comprise a connecting element 4 comprising a single hinge element 8. In an embodiment, such as that shown in FIG. 2, the multiple part electronic device 1 may comprise a connecting element 4 comprising two hinge elements 8 arranged at a distance from each other. In an embodiment, the connecting element 4 may comprise more than two hinge elements. In an embodiment, the haptic element may be a moving element configured to create a relative movement of the first housing portion 2 and the second housing portion.

Figure 3:
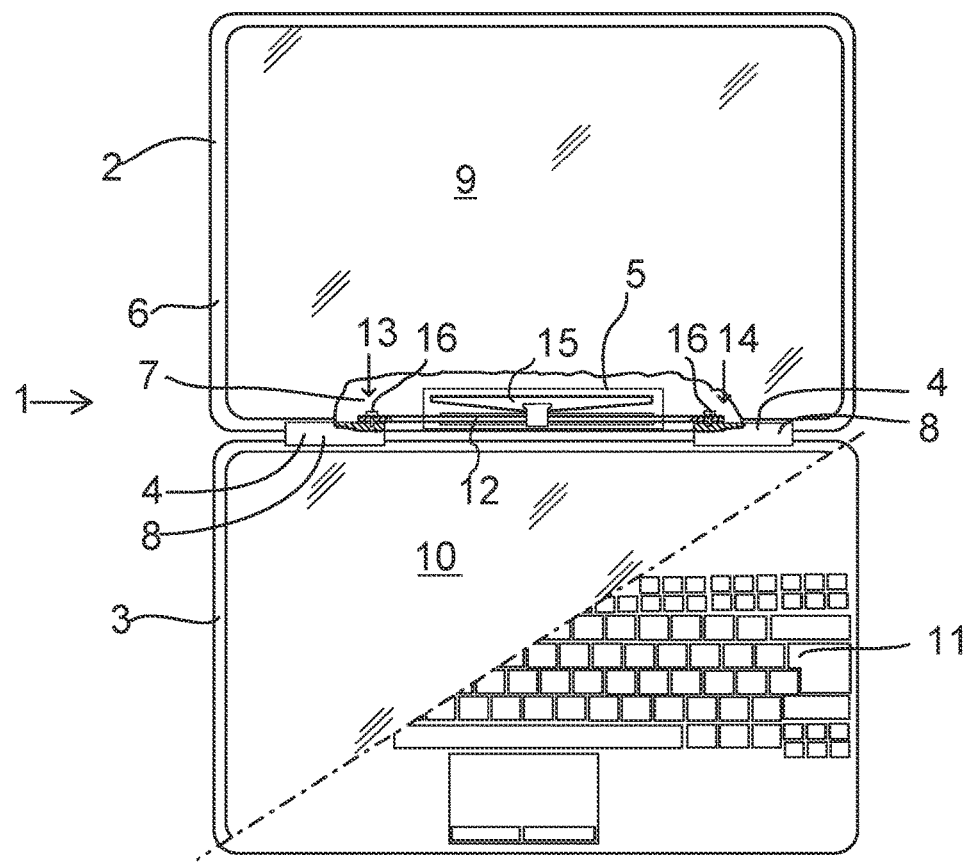
FIG. 3 illustrates a schematic top view of a multiple part electronic device comprising two housing portions according to an embodiment in a flat position.

FIG. 3 illustrates a multiple part electronic device 1 according to an embodiment. The electronic device 1 is foldable. It comprises a first housing portion 2 and a second housing portion 3. A connecting element 4 mechanically couples the first housing portion 2 to the second housing portion 3. A haptic element 5 configured to induce a haptic effect is arranged in the first housing portion 2. It is beneficial to arrange the haptic element in only one of the housing portions 2, 3. In an embodiment, if desired, one or more haptic elements may be arranged in both of the housing portions 2, 3.

The first housing portion 2 has a casing 6 having an inner space 7. The haptic element 5 is arranged in the inner space 7 of the casing 6. The haptic element 5 comprises a vibrating element configured to induce vibration of a suitable frequency and amplitude that constitutes a haptic feedback. In the embodiment of FIG. 3 the haptic element 5 comprises a piezo actuator. The haptic element 5 is in direct contact with the connecting element 4. The direct contact is essential for enabling the haptic effect to be transmitted by the connecting element 4. The connecting element 4 is a haptics guiding element configured to transmit the haptic effect between the first housing portion 2 and the second housing portion 3. The piezo actuator 5 comprises a piezo motor in a form of an elongated multilayer strip beam 12, also called as a bender, having a first end 13 and a second end 14. A mass body 15 is attached to the middle region of the beam 12 between the first end and the second end. In the embodiment of FIG. 3 the first end 13 of the strip beam 12 is fixedly attached with a screw 16 to one hinge element 8 and the second end 14 of the strip beam is fixedly attached with a screw 16 to another hinge element 8. In an embodiment, the ends 13, 14 of the strip beam 12 may be fixedly attached to the hinge elements 8 by glue.

Referring further to FIG. 3, in an embodiment at least one of the first housing portion 2 and the second housing portion 3 comprises a display 9, 10. The display 9, 10 may be a touch sensitive display. FIG. 3 schematically shows two alternative embodiments. In an embodiment the first housing portion 2 comprises a first display 9 and the second housing portion 3 comprises a second display 10. In an alternative embodiment, the first housing portion 2 comprises a display 9 and the second housing portion 3 comprises a keyboard 11.

Figure 4:
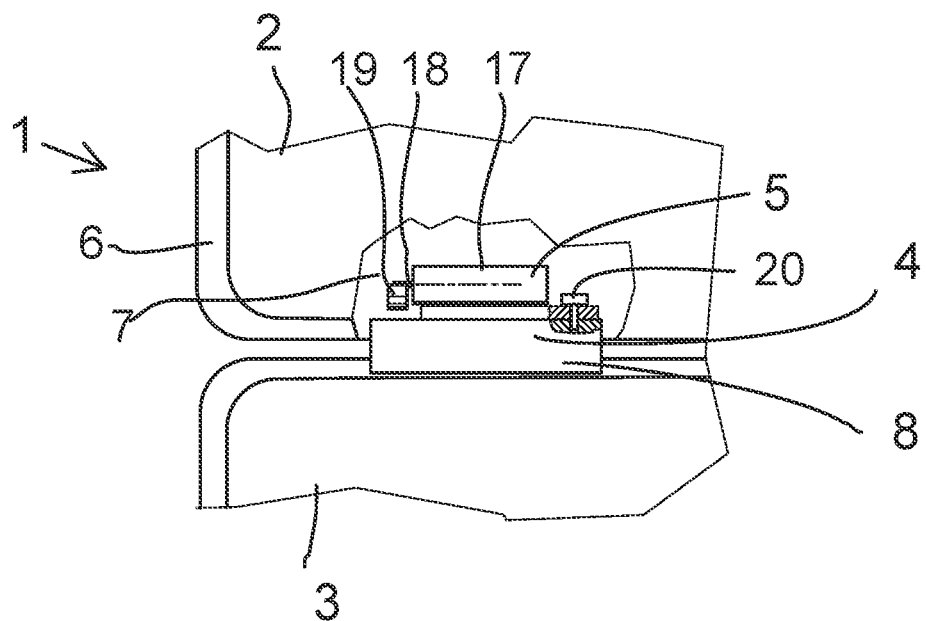
FIG. 4 illustrates a detail of a multiple part electronic device in a flat position according to an embodiment.
Figure 5:
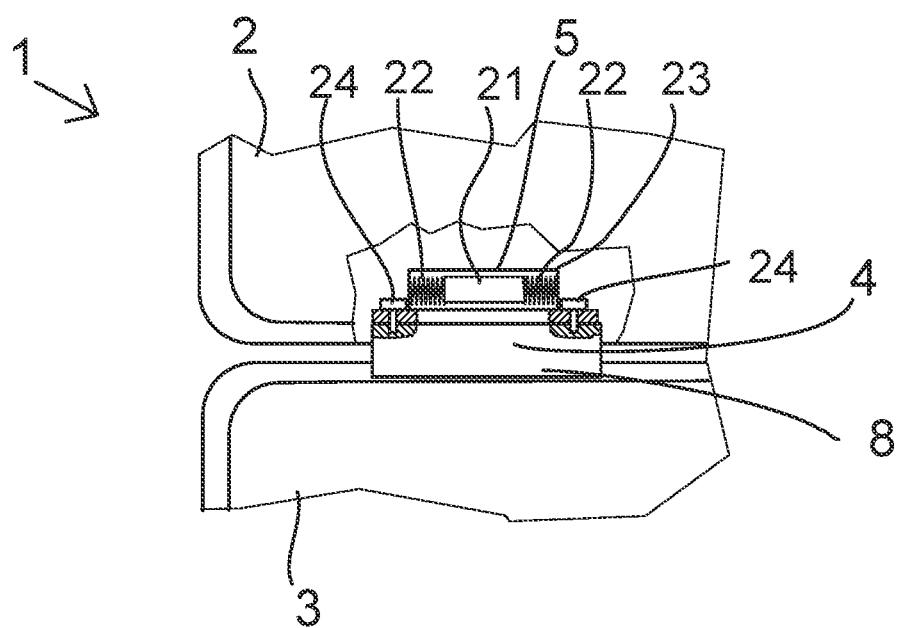
FIG. 5 illustrates an alternative detail of a multiple part electronic device in a flat position according to another embodiment.

FIG. 4 is a detail view of an embodiment of the multiple part electronic device 1. The electronic device 1 is foldable. It comprises a first housing portion 2 and a second housing portion 3. A connecting element 4 mechanically couples the first housing portion 2 to the second housing portion 3. A haptic element 5 configured to induce a haptic effect is arranged in the first housing portion 2. It is beneficial to arrange the haptic element in only one of the housing portions 2, 3. In an embodiment, if desired, one or more haptic elements may be arranged in both of the housing portions 2, 3. The first housing portion 2 has a casing 6 having an inner space 7. The haptic element 5 is arranged in the inner space 7 of the casing 6. The haptic element 5 comprises a vibrating element configured to induce vibration of a suitable frequency and amplitude that constitutes a haptic feedback. In the embodiment of FIG. 4 the haptic element 5 comprises an eccentric rotating mass actuator (ERM). The actuator 5 comprises an electric motor 17 having a rotating shaft 18 to which an eccentric mass 19 is attached. The ERM actuator 5 is fixedly attached with a screw 20 to the connecting element 4, such as to a hinge element 8. In an embodiment, the ERM actuator 5 may be fixedly attached to the hinge element 8 by glue.

FIG. 4 is a detail view of an embodiment of the multiple part electronic device 1. The electronic device 1 is foldable. It comprises a first housing portion 2 and a second housing portion 3. A connecting element 4 mechanically couples the first housing portion 2 to the second housing portion 3. A haptic element 5 configured to induce a haptic effect is arranged in the first housing portion 2. It is beneficial to arrange the haptic element in only one of the housing portions 2, 3. In an embodiment, if desired, one or more haptic elements may be arranged in both of the housing portions 2, 3. The first housing portion 2 has a casing 6 having an inner space 7. The haptic element 5 is arranged in the inner space 7 of the casing 6. The haptic element 5 comprises a linear resonant actuator (LRA). The LRA actuator 5 comprises a mass 21 mounted with springs 22 inside a housing 23. The mass 21 vibrates in a linear motion. The LRA actuator 5 is fixedly attached with screws 24 to the connecting element 4, such as to a hinge element 8. In an embodiment, the ERM actuator 5 may be fixedly attached to the hinge element 8 by glue.

Figure 6:
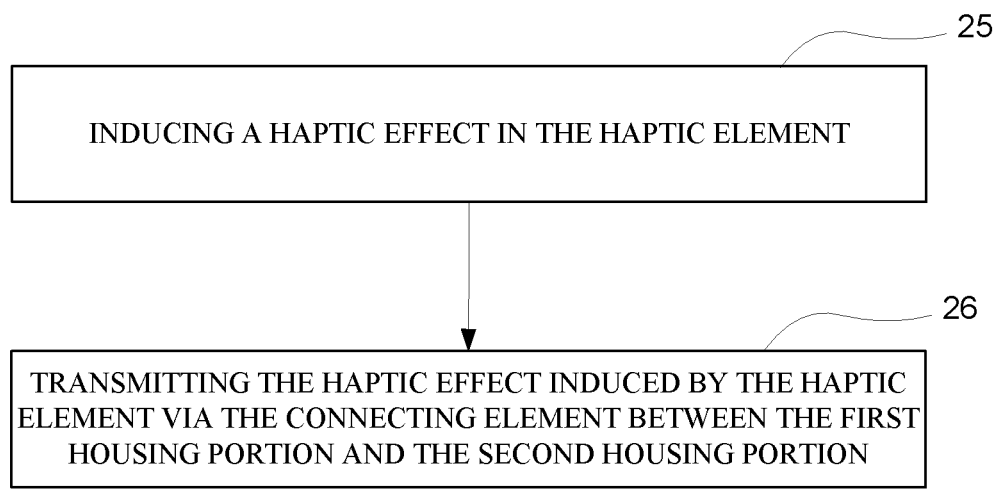
FIG. 6 illustrates a method for transmitting haptic feedback between portions in a multiple part electronic device.

With reference to FIGS. 1 to 6, in an embodiment, the method for transmitting haptic feedback between portions in a multiple part electronic device comprises steps of inducing a haptic effect in the haptic element 5, denoted by reference sign 25 in FIG. 6, and transmitting the haptic effect induced by the haptic element via the connecting element 4 between the first housing portion 2 and the second housing portion 3, denoted by reference sign 26 in FIG. 6. The haptic effect induced by the haptic element 5 may be a flickering movement or a vibration which can be sensed by the user. Vibration has a frequency and amplitude configured to generate tactile sensation. For example, the connecting element 4 constitutes exemplary means for connecting the housing portions 2, 3 together and for transmitting the haptic effect between the housing portions. As for a another example, the hinge element 8 constitutes exemplary means for connecting the housing portions 2, 3 together and for transmitting the haptic effect between the housing portions. As for another example, the haptic element 5 constitutes exemplary means for inducing a haptic effect. As for another example, a vibrating element constitutes exemplary means for inducing a haptic effect. As for another example, a piezo actuator constitutes exemplary means for inducing a haptic effect. As for another example, an eccentric rotating mass actuator constitutes exemplary means for inducing a haptic effect. As for yet another example, a linear resonant actuator constitutes exemplary means for inducing a haptic effect.

Some embodiments are further discussed shortly in the following.

In a first aspect, a multiple part electronic device comprises a first housing portion; a second housing portion; a connecting element that mechanically couples the first housing portion to the second housing portion; and a haptic element configured to induce a haptic effect is arranged in at least one of the first housing portion or the second housing portion, the haptic element being in contact with the connecting element, wherein said connecting element is a haptics guiding element configured to transmit the haptic effect between the first housing portion and the second housing portion.

In an embodiment which may be in accordance with the preceding embodiment, the haptic element is a moving element configured to create a relative movement of the housing portions.

In an embodiment which may be in accordance with any of the preceding embodiments, the haptic element comprises a vibrating element configured to induce vibration of a frequency and amplitude constituting a haptic feedback.

In an embodiment which may be in accordance with any of the preceding embodiments, at least one of the first housing portion and the second housing portion has a casing having an inner space, the haptic element being arranged in the inner space of the casing.

In an embodiment which may be in accordance with any of the preceding embodiments, the haptic element is arranged in only one of the first housing portion and the second housing portion.

In an embodiment which may be in accordance with any of the preceding embodiments, the haptic element comprises a piezo actuator.

In an embodiment which may be in accordance with any of the preceding embodiments, the haptic element comprises an eccentric rotating mass actuator.

In an embodiment which may be in accordance with any of the preceding embodiments, the haptic element comprises a linear resonant actuator.

In an embodiment which may be in accordance with any of the preceding embodiments, the haptic element is fixedly attached to the connecting element.

In an embodiment which may be in accordance with any of the preceding embodiments, the connecting element is a hinge element.

In an embodiment which may be in accordance with any of the preceding embodiments, the connecting element is configured to detachably connect the first housing portion and the second housing portion together.

In an embodiment which may be in accordance with any of the preceding embodiments, at least one of the first housing portion or the second housing portion comprises a display.

In an embodiment which may be in accordance with any of the preceding embodiments, the display is a touch sensitive display.

In an embodiment which may be in accordance with any of the preceding embodiments, the first housing portion comprises a first display and the second housing portion comprises a second display.

In an embodiment which may be in accordance with any of the preceding embodiments, at least one of the first housing portion and the second housing portion comprises a keyboard.

In an embodiment which may be in accordance with any of the preceding embodiments, the multiple part electronic device may be implemented as one of a laptop computer, a tablet computer, a smartphone, a mobile phone, a game console and a media player.

According a second aspect, provided is a method for transmitting haptic feedback between portions in a multiple part electronic device, the device comprising a first housing portion, a second housing portion, a connecting element that mechanically couples the first housing portion to the second housing portion, and a haptic element configured to induce a haptic effect is arranged in at least one of the first housing portion or the second housing portion, the haptic element being in direct contact with the connecting element. The method comprises steps of inducing a haptic effect in the haptic element, and transmitting the haptic effect induced by the haptic element via the connecting element between the first housing portion and the second housing portion.

In an embodiment which may be in accordance with the preceding embodiment, the haptic effect is vibration.

In an embodiment which may be in accordance with the preceding embodiment, the haptic effect is vibration having a frequency configured to generate tactile sensation.

According a third aspect a two-part electronic device comprises a first housing portion; a second housing portion; a touch sensitive display arranged in at least one of the first housing portion and the second housing portion; a hinge element that mechanically couples the first housing portion to the second housing portion for rotational movement about at least one rotation axis; and a vibrating element arranged in the first housing portion, the vibrating element being in direct contact and fixedly attached to the hinge element, said vibrating element being configured to induce vibration of a frequency constituting a haptic feedback. Said hinge element includes a vibration guiding element configured to transmit the vibration from the vibrating element located in the first housing portion to the second housing portion.

The embodiments illustrated and described herein as well as embodiments not specifically described herein but within the scope of aspects of the claims constitute exemplary means for coupling a first housing portion and a second housing portion together, for connecting such housing portions mechanically together, for inducing a haptic effect and for transmitting the haptic effect between the housing portions. For example, the connecting element 4 constitutes exemplary means for connecting the housing portions together and for transmitting the haptic effect between the housing portions. As for a another example, the hinge element 8 constitutes exemplary means for connecting the housing portions together and for transmitting the haptic effect between the housing portions. As for another example, the haptic element 5 constitutes exemplary means for inducing a haptic effect. As for another example, a vibrating element constitutes exemplary means for inducing a haptic effect. As for another example, a piezo actuator constitutes exemplary means for inducing a haptic effect. As for another example, an eccentric rotating mass actuator constitutes exemplary means for inducing a haptic effect. As for yet another example, a linear resonant actuator constitutes exemplary means for inducing a haptic effect. Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The invention claimed is:

1. A multiple part electronic device, comprising:
   a first housing portion;
   a second housing portion;
   a connecting element that mechanically couples the first housing portion to the second housing portion; and
   a haptic element configured to induce a haptic effect in both the first and the second housing portions, wherein the haptic element is arranged in at least one of the first housing portion or the second housing portion, the haptic element being separate from, and in contact with, the connecting element, wherein said connecting element is a haptics guiding element configured to transmit the haptic effect between the first housing portion and the second housing portion.

2. The multiple part electronic device as defined in claim 1, wherein the haptic element is a moving element configured to create a relative movement of the housing portions.

3. The multiple part electronic device as defined in claim 1, wherein the haptic element comprises a vibrating element configured to induce vibration of a frequency and amplitude constituting a haptic feedback.

4. The multiple part electronic device as defined in claim 1, wherein at least one of the first housing portion and the second housing portion has a casing having an inner space, the haptic element being arranged in the inner space of the casing.

5. The multiple part electronic device as defined in claim 1, wherein the haptic element is arranged in only one of the first housing portion and the second housing portion.

6. The multiple part electronic device as defined in claim 1, wherein the haptic element comprises a piezo actuator.

7. The multiple part electronic device as defined in claim 1, wherein the haptic element comprises an eccentric rotating mass actuator.

8. The multiple part electronic device as defined in claim 1, wherein the haptic element comprises a linear resonant actuator.

9. The multiple part electronic device as defined in claim 1, wherein the haptic element is fixedly attached to the connecting element.

10. The multiple part electronic device as defined in claim 1, wherein the connecting element comprises a hinge element.

11. The multiple part electronic device as defined in claim 1, wherein the connecting element is configured to detachably connect the first housing portion and the second housing portion together.

12. The multiple part electronic device as defined in claim 1, wherein at least one of the first housing portion or the second housing portion comprises a display.

13. The multiple part electronic device as defined in claim 12, wherein the display is a touch sensitive display.

14. The multiple part electronic device as defined in claim 1, wherein the first housing portion comprises a first display and the second housing portion comprises a second display.

15. The multiple part electronic device as defined in claim 1, wherein one of the first housing portion or the second housing portion comprises a keyboard.

16. The multiple part electronic device as defined in claim 1, implemented as one of a laptop computer, a tablet computer, a phablet, a smartphone, a mobile phone, a game console, a music player, and a media player.

17. A method for transmitting haptic feedback between portions in a multiple part electronic device, the device comprising a first housing portion, a second housing portion, a connecting element that mechanically couples the first housing portion to the second housing portion, and a haptic element configured to induce a haptic effect in both the first and the second housing portions, wherein the haptic element is arranged in at least one of the first housing portion or the second housing portion, the haptic element being separate from, and in contact with, the connecting element, the method comprising operations of:
   inducing a haptic effect in the haptic element, and
   transmitting the haptic effect induced by the haptic element via the connecting element between the first housing portion and the second housing portion.

18. The method as defined in claim 17, wherein the haptic effect is vibration.

19. The method as defined in claim 18, wherein the haptic effect is vibration having a frequency configured to generate tactile sensation.

20. A two-part electronic device, comprising:
   a first housing portion;
   a second housing portion;
   a touch sensitive display arranged in at least one of the first housing portion and the second housing portion;
   a hinge element that mechanically couples the first housing portion to the second housing portion for rotational movement about at least one rotation axis; and
   a vibrating element arranged in the first housing portion, the vibrating element being separate from, in direct contact with, and fixedly attached to the hinge element, said vibrating element being configured to induce vibration of a frequency constituting a haptic feedback in both the first and the second housing portions,
   wherein said hinge element includes a vibration guiding element configured to transmit the vibration from the vibrating element located in the first housing portion to the second housing portion.

* * * * *